2,244,562

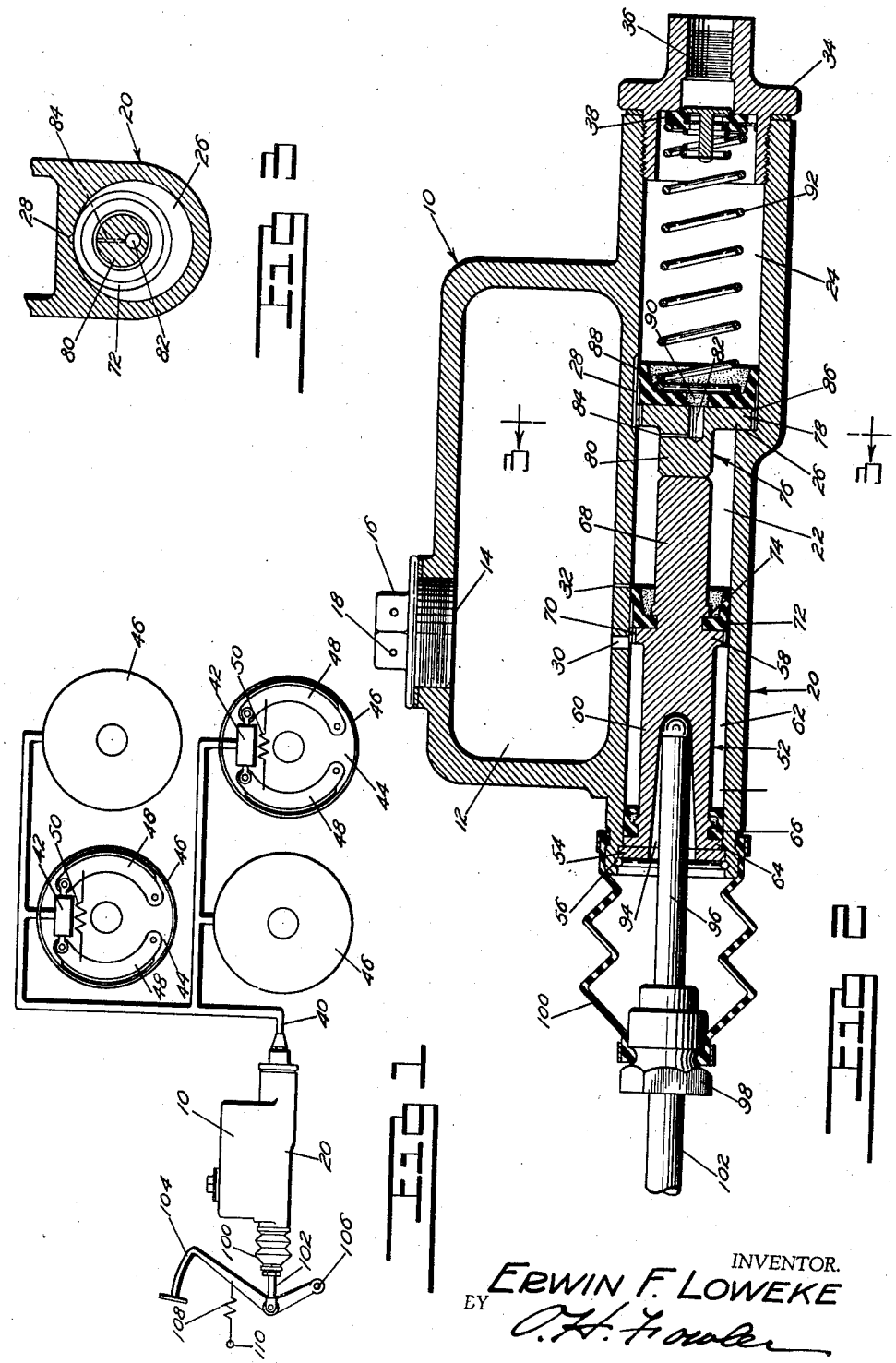
June 3, 1941.  E. F. LOWEKE  2,244,562
FLUID PRESSURE PRODUCING DEVICE
Filed July 29, 1940
INVENTOR.
ERWIN F. LOWEKE Patented June 3, 1941

UNITED STATES PATENT OFFICE 2,244,562

FLUID PRESSURE PRODUCING DEVICE

Erwin F. Loweke, Detroit, Mich., assignor to Hydraulic Brake Company, Detroit, Mich., a corporation of California Application July 29, 1940, Serial No. 348,297

6 Claims. (Cl. 60—54.6)

This invention relates to fluid pressure braking systems and more particularly to fluid pressure producing devices.

Heretofore, fluid pressure producing devices of the two-stage type have generally included a large chamber and a small chamber arranged concentrically to and in direct communication with the small chamber and pistons movable in the chambers for producing pressure therein.

In fluid pressure producing devices having these characteristics, particularly in fluid pressure producing devices wherein the large chamber is positioned forward of the small chamber, difficulty has been found in excluding gas or air bubbles from the fluid in the cylinder particularly at the union or juncture of the large and small chambers. The present invention aims to overcome this difficulty.

An object of the invention is to provide a low pressure producing means, a high pressure producing means, and means for creating pressure in each of the pressure producing means and means for the elimination of any air or gas bubbles that may be present in the fluid in the pressure producing device.

Other objects and advantages of the invention will hereinafter appear from the following description taken in connection with the accompanying drawing forming a part of this specification, and in which—

Fig. 1 is a schematic view of a fluid pressure braking system embodying the invention;

Fig. 2 is a vertical sectional view of the fluid pressure producing device; and

Fig. 3 is a cross sectional view substantially on line 3—3, Fig. 2.

Referring to the drawing for more specific details of the invention, 10 represents a fluid pressure producing device including a reservoir 12 having a filling opening 14 normally closed by a plug 16 provided with openings 18 for venting the reservoir to the atmosphere. A cylinder 20 at the base of the reservoir includes a small chamber 22 and the relatively large chamber 24 arranged concentrically to, forward of and in direct communication with the small chamber and providing at its conjunction with the small chamber, a concentric shoulder 26.

The inner circumferential walls of the chambers 22 and 24 preferably converge at the base of the reservoir. As shown, the chambers are excentrically disposed to one another by the difference in the radii of the two diameters of the chambers. Arranged in the wall of the chambers 22 and 24 is a by-pass 28 providing a communication between the small chamber 22 and the large chamber 24. The small chamber 22 has in this wall spaced ports 30 and 32 providing communications between the small chamber and the reservoir. The outer end of the large chamber is closed as by a head 34 provided with a discharge port 36 controlled as by a two-way valve 38 and the outer end of the small chamber is open.

A fluid pressure delivery pipe or conduit 40 connected to the discharge port 36 has branches connected respectively to fluid pressure actuated motors 42 preferably arranged in pairs, one pair for actuating brakes associated with the front wheels of a vehicle and another pair for actuating brakes associated with the rear wheels of the vehicle.

The brakes are of a conventional type, each including a fixed support or backing plate 44, a rotatable drum 46 associated therewith, a pair of corresponding friction elements or shoes 48, mounted on the backing plate for cooperation with the drum, a retractile spring 50 connecting the shoes, and a fluid pressure actuated motor corresponding to the motors 42 mounted on the backing plate and connected to the shoes for activating the shoes into engagement with the drum against the resistance of the retractile spring 50.

A piston 52 reciprocable in the chamber 22 is held against displacement by a washer 54 seated on an annular shoulder in the open end of the chamber 22 and held against displacement as by a retaining ring 56 seated in a circumferential groove in the wall of the chamber. The piston 52 includes a head 58, a reduced body portion 60 providing in conjunction with the wall of the cylinder an annular chamber 62 communicating with the reservoir 10 as by way of port 30, and a skirt 64 having seated thereon a sealing cup 66 for inhibiting seepage of fluid from the cylinder past the piston. The head 58 of the piston has a concentric extension 68, and a plurality of passages 70 therethrough providing communications between the annular chamber 22 and that portion of the cylinder forward of the piston. A sealing cup 72 sleeved over the extension 68 and seated on the head 58 of the piston is held against displacement by a circumferential flange 74 on the extension. This cup controls the passages 70 through the head of the piston.

A floating piston 76 reciprocable in the chamber 24 normally seats on the eccentric shoulder 26 at the juncture of the chambers. This piston includes a head 78 and a rearwardly extended projection 80 normally seated on the extension 68 of the piston 52. The head 78 of the piston 76 has a concentrically disposed bore 82 opening into the chamber 24 and communicating with the chamber 22 by way of a restricted passage 84. The piston also has arranged in its head a plurality of spaced passages 86 providing communications between the chamber 22 and the chamber 24.

A sealing cup 88 seated on the head 78 of the piston 76 has a concentric opening 90 registering with the bore 82 in the head, and a spring 92 interposed between the cup 88 and the two-way valve 36 serves to retain the cup and valve against displacement and also to return the pistons to their respective retracted positions.

The piston 52 has in its back, a recess or socket 94 extended well into the body of the piston. A thrust rod 96 has one of its ends seated in the socket 94 and on the other end of this thrust rod is a coupling 98 connected to the open end of the chamber 22 as by a flexible boot 100 for the exclusion of dust and other foreign substances from the cylinder.

A rod 102 connects the coupling 98 to a foot pedal lever 104 rockably mounted on a stub shaft 106 and connected by a retractile spring 108 to a fixed support 110.

In a normal braking operation, upon depressing the foot pedal lever 104 force is transmitted from the lever through the rod 102 and thrust pin 96 to the piston 52, resulting in moving the pistons 52 and 76 on the compression stroke.

During the initial movement of the pistons on the compression stroke, the cup 72 on the head of the piston 54 covers the port 32 and thereafter, as the pistons advance on the compression stroke, fluid is displaced from the chamber 24 past the two-way valve 38 through the discharge port 36 and fluid pressure delivery pipe 40 and its respective branches into the fluid pressure actuated motors 42, causing energization of the motors 42 with the resultant activation of the friction elements or shoes 48 into engagement with the drums 46 against the resistance of the retractile springs 50.

Because of the large diameter of the chamber 24, the displacement of fluid therefrom during advance of the piston 76 is of large volume. This results in a rapid or quick movement of the friction elements into engagement with the drum. During this operation a small quantity of fluid is displaced from the chamber 24 through the passages 82 and 84 into the chamber 22. Upon engagement of the friction elements or shoes with the drum, substantial resistance is offered to the movement of the pistons. This results in a material increase of pressure on the fluid in the chamber 24 causing rapid displacement of fluid therefrom through the passages 82 and 84 into the chamber 22 resulting in equalizing the pressures on the fluid in the chambers 22 and 24 and thereafter the piston 76 becomes ineffective for producing pressure.

Although the flow of fluid from the chamber 24 through the passages 82 and 84 into the chamber 22 during this operation is quite rapid as compared to the corresponding movement of the fluid during the initial actuation, it is effective to accomplish a gradual transition from low to high pressure over a wide range so as to smooth out the operation.

Upon completion of a braking operation, the applied force of the foot pedal lever 104 is released. This results in movement of the foot pedal lever to its retracted position under the influence of the retractile spring 108, carrying with it the rod 102 and the thrust pin 96. Upon retraction of the thrust pin 96, the pistons 52 and 76 are released and are returned to their respective retracted positions under the influence of the spring 92. As the pistons move to their retracted positions a partial vacuum is created in the chamber 24. This results in drawing fluid from the reservoir 12 through the port 30 into the annular chamber 62, thence through the passages 70 in the head 58 of the piston 52 past the sealing cup 72 into the small chamber 22, thence through the passages 86 in the head 78 of the piston 76 past the sealing cup 88 into the large chamber 24 completely filling both chambers.

During this operation, fluid is returning to the chamber 24 from the fluid pressure actuated motors 42 and fluid pressure delivery pipes connecting these motors to the chamber 24. This may result in the chamber 24 receiving a quantity of fluid in excess of its capacity and in that event the excess fluid is displaced therefrom through the by-pass 28 and the passages 82 and 84 into the chamber 22, thence through the port 32 into the reservoir.

It will be observed from the foregoing, that because of the relation of the chambers 22 and 24 to one another, possibility of air and gas bubbles collecting in the chambers 22 and 24 is inhibited.

While this invention has been described in connection with certain specific embodiments, the principle involved is susceptible of numerous other applications that will readily occur to persons skilled in the art. The invention is, therefore, to be limited only as indicated by the scope of the appended claims.

Having described the various features of the invention, what I claim as new and desire to secure by Letters Patent is:

1. A fluid pressure producing device comprising a cylinder having a small chamber and a relatively large chamber arranged eccentrically to, forward of, and in communication with the small chamber, a piston reciprocable in the small chamber, a floating piston in the large chamber, and means for actuating the pistons.

2. A fluid pressure producing device comprising a cylinder having a small chamber and a relatively large chamber arranged eccentrically to, forward of, and in communication with the small chamber, a by-pass in the wall of the cylinder straddling the juncture of the chambers, a piston reciprocable in the small chamber, a floating piston in the large chamber, and means for actuating the pistons.

3. A fluid pressure producing device comprising a cylinder having a small chamber and a relatively large chamber arranged eccentrically to, forward of, and in communication with the small chamber, a by-pass straddling the juncture of the chambers, a piston reciprocable in the small chamber, a floating piston in the large chamber having a restricted passage therethrough and means for actuating the pistons concomitantly.

4. A fluid pressure producing device comprising a cylinder having a small chamber and a relatively large chamber arranged eccentrically to the small chamber by the difference in the radii of the diameters of the chambers, a by-pass in the wall of the cylinder straddling the juncture of the chambers, a piston reciprocable in the small chamber, a floating piston in the large chamber having a restricted passage therethrough and means for actuating the pistons in unison.

5. A fluid pressure producing device comprising a cylinder having a small chamber and a relatively large chamber arranged forward of, in communication with, and eccentrically to the small chamber by the difference in the radii of the diameters of the chambers, a by-pass straddling the juncture of the chambers, a piston reciprocable in the small chamber, a floating piston in the large chamber having a restricted passage therethrough and means for actuating the pistons in unison.

6. A fluid pressure producing device comprising a reservoir, a cylinder supplied therefrom including a small chamber and a relatively large chamber arranged forward of, in communication with, and eccentrically to the small chamber by the difference in the radii of the chambers, a by-pass in the wall of the cylinder straddling the juncture of the chambers where the walls of the chambers converge, a piston reciprocable in the small chamber, an extension on the piston, a floating piston in the large chamber normally seated on the extension having a restricted passage therethrough, and means for actuating the pistons.

ERWIN F. LOWEKE.